United States Patent

Fowler et al.

[11] Patent Number: 5,850,289
[45] Date of Patent: Dec. 15, 1998

[54] SCANNING ARRANGEMENT AND METHOD

[75] Inventors: Guy Richard John Fowler, Beaconsfield; Christopher Peter Flockhart, Burton Pedwardine, both of United Kingdom

[73] Assignee: Tricorder Technology PLC, London, United Kingdom

[21] Appl. No.: 804,920

[22] Filed: Feb. 24, 1997

Related U.S. Application Data

[63] Continuation of PCT/GB95/01994, Aug. 22, 1995, published as WO96/06325, Feb. 29, 1996.

[30] Foreign Application Priority Data

Aug. 24, 1994 [GB] United Kingdom .................... 9417108
Jul. 25, 1995 [GB] United Kingdom .................... 9515247

[51] Int. Cl.$^6$ ............................................. G01B 11/04
[52] U.S. Cl. ..................................... 350/376; 250/559.22
[58] Field of Search .................................... 356/375, 376, 356/371, 3.14, 141.4; 250/558, 234–236, 559.22, 559.23; 348/42, 135; 359/212, 213, 223–225

[56] References Cited

U.S. PATENT DOCUMENTS

| | | | |
|---|---|---|---|
| 4,648,717 | 3/1987 | Ross et al. | 356/376 |
| 4,794,262 | 12/1988 | Sato et al. | 356/376 |
| 4,993,836 | 2/1991 | Furuhashi et al. | |
| 5,198,877 | 3/1993 | Schulz | 356/375 |
| 5,259,037 | 11/1993 | Plunk | |
| 5,436,727 | 7/1995 | Yokoyama et al. | 356/376 |
| 5,557,397 | 9/1996 | Hyde et al. | |

FOREIGN PATENT DOCUMENTS

| | | |
|---|---|---|
| 0747870 | 12/1996 | European Pat. Off. |
| 7-174537 | 7/1995 | Japan |
| 7-174538 | 7/1995 | Japan |
| 2 045 938 | 11/1980 | United Kingdom |
| WO91/09273 | 6/1991 | WIPO |

*Primary Examiner*—Hoa Q. Pham
*Attorney, Agent, or Firm*—Jacobson, Price, Holman & Stern, PLLC

[57] ABSTRACT

A scanning arrangement has a device (40) for projecting a two-dimensional optical pattern on a surface (35) of a scanned object. A two-dimensional photodetector (34') is mounted within a hand-held scanning device and outputs scan files of 3D coordinate data of overlapping surface portions of the object. The surface portions defined by these scan files are registered by appropriate rotations and translations in a computer, which are determined either from the outputs of a gyroscope (51) and an accelerometer (50) or by mathematical processing of the surface portions, e.g., involving detecting and location of common features.

33 Claims, 6 Drawing Sheets

SCANNING ARRANGEMENT AND METHOD

This application is a continuation of PCT/GB95/01994 filed on Aug. 22, 1995.

BACKGROUND OF THE INVENTION

1. Field of the Invention

The present invention relates to a scanning arrangement and method for determining the shape, size or other three-dimensional surface characteristics of an object, such as colour for example.

2. Description of the Related Art

A number of patents and published patent applications disclose optical scanning systems which rely on a scanned laser beam or the like for determining the shape of an object. Usually such systems utilise a fixed mounting for the scanning system and utilise optical triangulation for determining depth information. Examples of such systems include U.S. Pat. No. 4,627,734 (Rex), EP-B-233,920 (Addleman) and WO 94/15173 (Crampton).

There is a need for a scanner for determining shape or other surface characteristics which can be hand-held. As far as we are aware, only one such system is known, namely that disclosed in U.S. Pat. No. 5,198,877 (Schulz) and its equivalent EP-A-553,266.

The Schulz system requires an externally generated coordinate system defined by an array of photodetectors which detects an array of pilot lights on the scanner. Hence the scanner can only be used within this coordinate system and furthermore the array of pilot lights must be kept in view by the array of photodetectors, which further restricts the mobility of the scanner. This is a serious disadvantage because it is normally necessary to scan the object of interest from all sides in order to build up a complete picture of its surface.

SUMMARY OF THE INVENTION

An object of the present invention is to provide a scanning arrangement and method in which the scanner can be moved freely without reference to the position of its mounting.

Accordingly the invention provides a scanning arrangement for determining the shape or other three-dimensional surface characteristics of an object, the arrangement comprising a scanning device which is freely movable relative to said object, the device comprising:

a) an optical projector for projecting a predetermined pattern onto a region of the surface of the object, and b) an optical detector for detecting the coordinates or other surface characteristics of said region and for generating output signals representative of such coordinates or other surface characteristics, the arrangement further including:

c) processing means coupled to said detector for generating a set of output data representing said surface characteristics of a scanned portion of the surface of said object, d) combining means coupled to said processing means for combining sets of such output data derived from overlapping scans of said surface into a common set of output data by appropriate rotations and translations, said combining means optionally including further processing means for calculating said rotations and translations from subsets of respective sets of such output data which relate to a common area of said surface, e) optionally, inertial sensing means for detecting movement of said scanning device relative to said object and generating output signals representative of such movement, and f) correcting means for correcting for movement of said scanning device relative to said object between successive scans, said correcting means being responsive to at least one of:

i) output signals from said inertial sensing means (if present)

ii) output data from said further processing means (if present), the arrangement including either said inertial sensing means or said further processing means or both.

In one embodiment the scanning device carries inertial sensing means for sensing its linear acceleration and rotation sensing means for sensing its rate of rotation. By double integrating the output of the inertial sensing means with respect to time and integrating the output of the rotational sensing means with respect to time the position and attitude of the scanning device can be detected throughout the scanning process and these parameters can be applied by the correcting means to correct the output of the optical detector.

In another embodiment the correcting means effectively consists of the combining means, which in this embodiment comprises further processing means for determining the translations and/or rotations required to combine the data from successive scans.

The invention also provides a method of determining the shape or other three-dimensional surface characteristics of an object by means of a scanning device which is freely movable with respect to the object, the method comprising:

i) projecting from the scanning device a predetermined optical pattern onto a region of the surface of the object, ii) optically detecting the coordinates or other surface characteristics of said region with an optical detector mounted on said scanning device, iii) deriving a set of output data representing said coordinates or other surface characteristics of said region, iv) repeatedly scanning said optical pattern over said object in overlapping fashion and deriving further sets of output data from overlapping scans, and v) correcting said sets of output data for movement of said scanning device relative to said object between successive scans either by sensing movement of said scanning device relative to said object with an inertial sensing means (50, 51) or by determining the rotations and/or translations needed to superimpose subsets of respective sets of said output data which relate to an area of said surface which is common to said sets.

BRIEF DESCRIPTION OF THE DRAWINGS

Preferred embodiments of the present invention will now be described by way of example only with reference to FIGS. 1 to 6 of the accompanying drawings, in which.

DETAILED DESCRIPTION OF THE PREFERRED EMBODIMENTS

Figure 1:
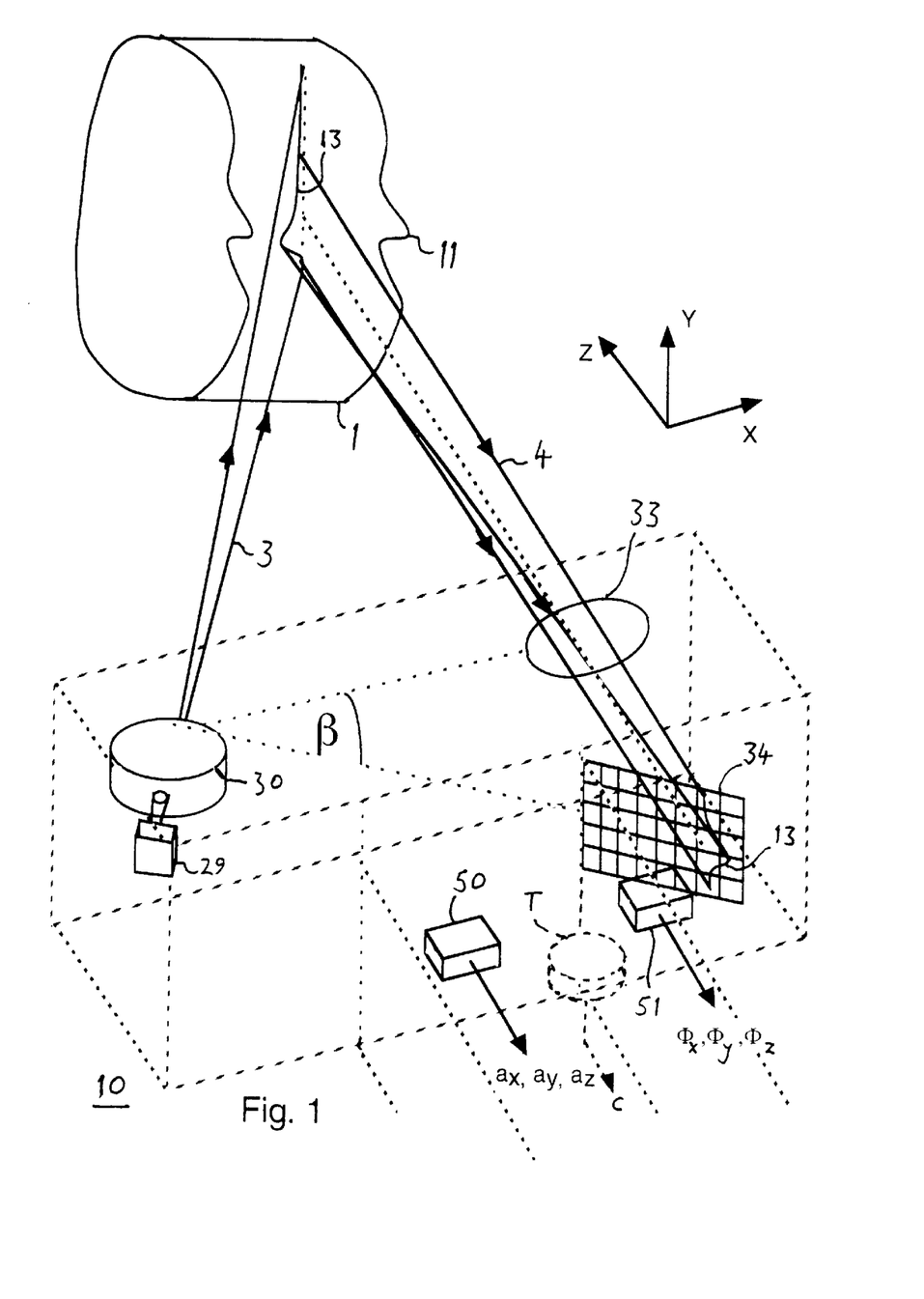
FIG. 1 is a schematic perspective view of one scanning device (utilising a linear scanning pattern) in accordance with the invention, showing the geometry of the optical system.

The generally T-shaped scanning device 10 shown schematically in FIG. 1 is hand held and comprises a projector which generates a vertical fan-shaped beam of light 3 onto an object 1 of unknown shape and a lens 33 which collects diffusely reflected light 4 from the illuminated region of the object and images the projection 13 of this beam on the object's surface onto a two-dimensional photodetector 34. The beam 3 is generated by a laser 29 (which is preferably a semiconductor laser with beam-shaping optics but may be a He-Ne laser for example) and a cylindrical lens 30 and the photodetector 34 may consist of a two-dimensional CCD array with several hundred photosensitive elements along each dimension for example. In an another embodiment (not shown) the scanning device can be generally C-shaped, having the beam generator in one limb, the photodetector in the other and a grip between the two limbs, and can be used with the grip approximately vertical and the fan-shaped beam approximately horizontal.

In order to maximise depth of field and simplify the geometry of the arrangement, the photodetector 34 is inclined in the horizontal (z-x) plane at an angle $\beta$ to the x-y plane, whose normal is parallel to the optical axis of the lens 33, $\beta$ being such that the Scheimpflug condition is satisfied. In this condition, the image of the photodetector 34 is projected by lens 33 into the plane of fan-shaped beam 3 and the image 13' formed on the photodetector 34 corresponds to the profile of the 30 object surface as viewed at a right angle to the plane of beam 3. For example a ride 11 is shown on the front of the object and this feature is clearly visible in the image 13 of the profile. Except when the magnification of the lens 33 is unity (so that the projection stripe 13 and image 13' are symmetrically located on either side of lens 33) the image 13 is a distorted representation of projection stripe 13 and in general the range magnification $M_R$ (the ratio of horizontal displacement of an image point on the photodetector to horizontal displacement of the corresponding projection point in the plane of beam 3) is given by $M_R = M_L \sin g$ where $M_L$ is the lateral magnification and g is the angle in the horizontal plane between the optical axis of the lens 33 and the beam 3.

Figure 2:
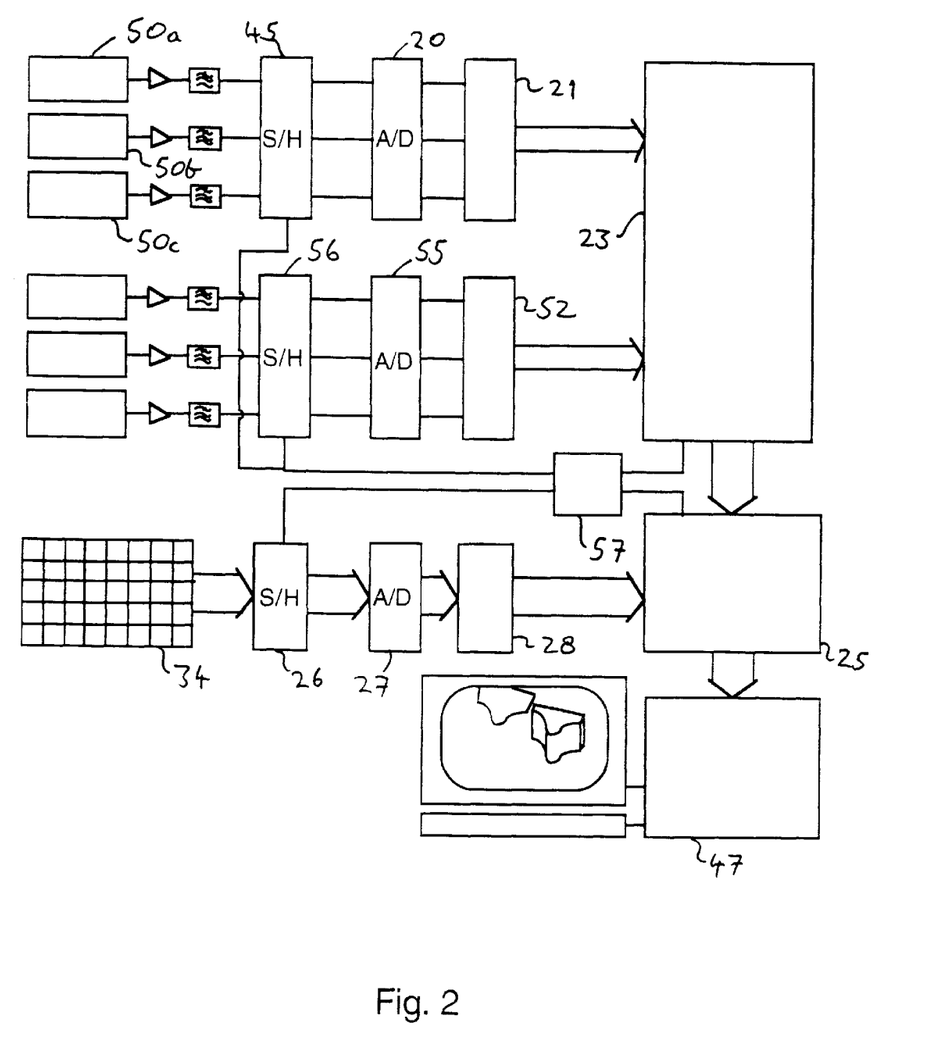
FIG. 2 is a block diagram of the scanning arrangement utilising the scanning device of FIG. 1.
Figure 3:
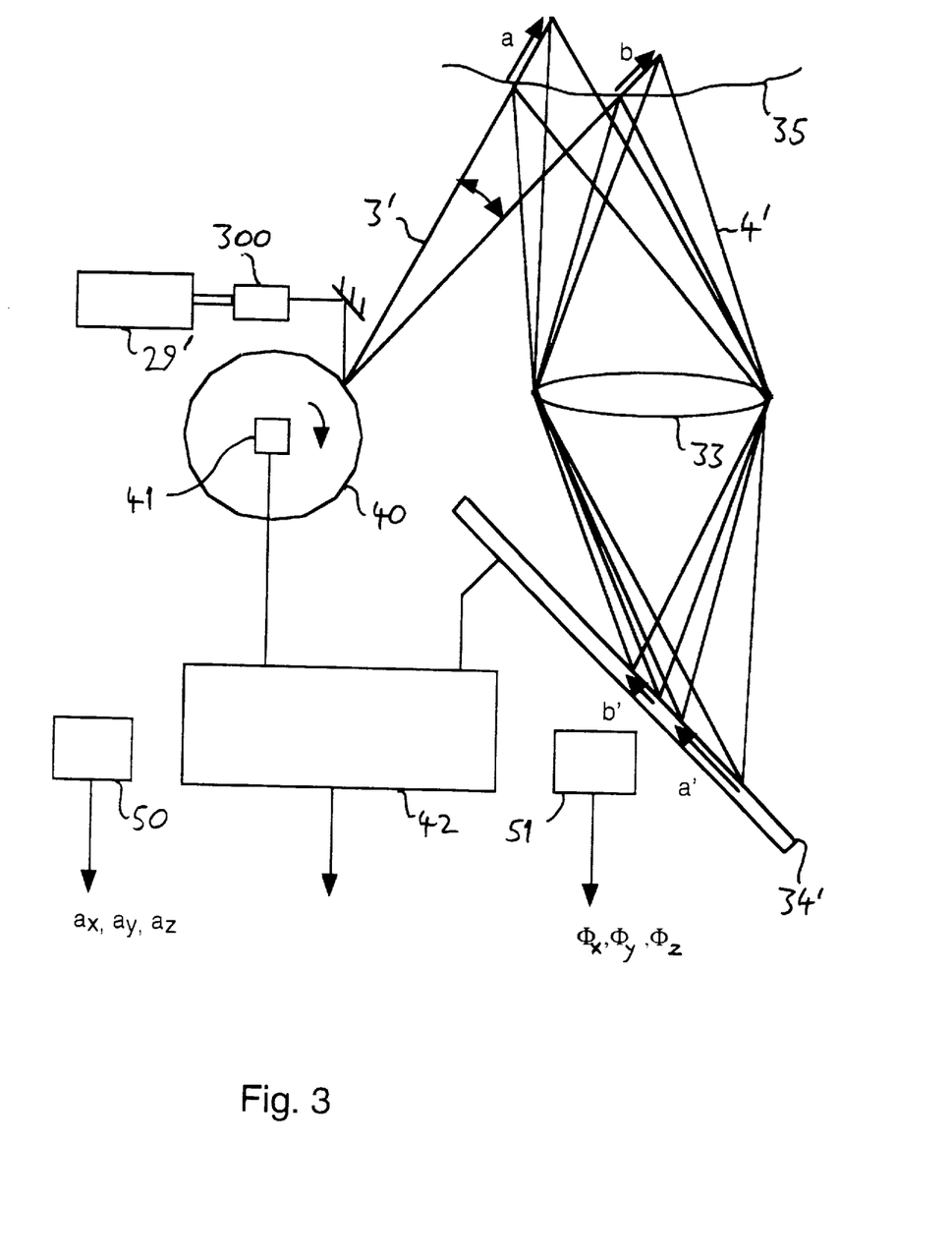
FIG. 3 is a plan view showing the optics of another scanning device (utilising a two-dimensional scanning pattern) for use in a scanning arrangement in accordance with the invention.

The Scheimpflug condition is discussed in Rex et al, OPTICAL ENGINEERING, December 1987 Vol 26 No 12 p 1245 and is illustrated in FIGS. 2 and 3 of that paper, which is incorporated herein by reference.

Accordingly it will be apparent to persons skilled in the art of optical engineering that the profile of the surface of the object 1 (as viewed at right angles to the plane of beam 3) can be derived from the output of the photodetector 34.

In use, the scanning device 10 is used to sweep the stripe 13 over the entire surface of object 1. During this process, the changes in angular orientation of the scanning device are detected by a vibrators gyroscope 51 which generates output signals $\phi_x$, $\phi_y$, $\phi_z$ indicative of the rate of rotation of scanning device 10 about axes x, y and z respectively. Miniature vibratory gyroscopes are commercially available at low cost and rely on Coriolis forces set up in a vibrating shell or other structure.

Similarly, the acceleration of the scanning device along the x, y and z axes is detected by an accelerometer 50 which Generates respective acceleration signals $a_x$, $a_y$ and $a_z$ respectively. Preferably the sensitive axes of the gyroscope 51 are close to the centre of photodetector 34 in order to simplify subsequent computation but this is not essential.

The scanning device also includes a trigger switch T which is operable by the user to start and stop the acquisition of data from the photodetector. This trigger switch T outputs control signals c.

It is also within the scope of the invention to locate the accelerometer and gyroscope on the object 1 and to keep the scanning device stationary whilst maneuvering the object so as to sweep the stripe 13 across the surface of the object. This may be useful in cases where movement of the object is unavoidable, e.g. if the object is part of the human body such as a patient's head for example.

The circuitry for processing the output signals from the photodetector 34, the scope 51 and the accelerometer 50 is shown in FIG. 2. These output signals may be conveyed to the circuitry by a flexible cable or wireless link for example or may for example be digitised and stored in local memory such as a high capacity miniature hard disc (not shown) in the scanning device, enabling the scanning device to be used remotely from its processing circuitry and enabling the processing to be carried out after scanning has been completed. At least some of the circuitry of FIG. 2 may be located in the scanning device.

Preferably, the generation and/or acquisition of data from the photodetector 34 is gated by signals from the gyroscope 51 and/or accelerometer 50 which prevent the determination of position and/or attitude of the scanner under conditions in which the angular rotation or acceleration are too great or too small (e.g. as a result of noise or drift ) to enable accurate calculations to be made.

Turning now to FIG. 2, the accelerometer is shown as three blocks 50a to 50c which output signals indicative of the acceleration along the x, y and z axes respectively and the gyroscope is similarly represented as blocks 51a to 51c which output signals indicative of the rate of rotation about axes x, y and z respectively. The acceleration signals are amplified by conventional low noise and drift preamplifier circuits and fed via sample and hold circuitry 45 to an 14 bit analogue-to-digital converter 20. Similarly the rotation signals are amplified by conventional low noise and drift preamplifier circuits and fed via sample and hold circuitry 56 to a 14 bit analogue-to-digital converter 55. The sample and hold circuitry 45, 55 samples at a rate of 5,000 per second. The digitised signals from analogue-to-digital converters 20 and 55 are fed to signal conditioning circuits 21 and 52 respectively which include digital filters for filtering out noise, correct for nonlinearity in the accelerometer or gyroscope outputs (e.g. by employing look-up tables) and correct for drift due to temperature variations.

The resulting data is fed to a digital signal processor 23 where corrections are made for the offsets (if any) of the sensitive axes of the gyroscope 51 from the photodetector 34 and for the distance between the accelerometer 50 and the gyroscope 51. Such corrections are necessary because, for example a sudden rotation centred on accelerometer 50 would cause a significant acceleration of photodetector 34 but would not be detected as such by the accelerometer. However the resulting rate of change of the rate of rotation detected by gyroscope 51 could be used, in conjunction with the known separation between the accelerometer and gyroscope and the output of the accelerometer, to calculate the acceleration of the photodetector, as will be apparent to persons skilled in the art. It should also be noted that in principle, the rate of rotation and acceleration of the photodetector could be calculated from the outputs of two spaced apart gyroscopes (each sensitive about all three axes) or two spaced apart accelerometers (each sensitive along all three axes) provided that their positions relative to the photodetector were known.

The processor 23 double integrates successive values of the corrected photodetector acceleration (along the x, y and z axes) by means of a double integration algorithm to determine the instantaneous position of the photodetector (relative to an arbitrary starting position) throughout the scan. Since the sample and hold circuits 45 and 56 are clocked at a rapid rate (e.g. 5 kHz) by clocking circuitry 57, this position sensing takes place essentially in real time.

Similarly the processor 23 integrates successive values of the corrected photodetector rate of rotation (about the x, y and z axes) by means of an integration algorithm to determine the instantaneous orientation of the photodetector throughout the scan, again essentially in real time.

The above integrations are performed on groups of 100 samples to update position and attitude 50 times per second, which matches the sampling rate of photodetector 34.

The above position and orientation signals are fed to a scan data processor 25 which also receives digitised profiles of the surface of the object 1 from photodetector 34 via sample and hold circuit 26, 14 bit analogue-to-digital converter 27 and correction circuitry 28. Correction circuitry 28 corrects for any distortion in the optics of the scanning device 10 (particularly distortion by the lens 33), derives the true profile of projected stripe 13 (as viewed at right angles to the plane of beam 3) from the image 13' by applying appropriate corrections (e.g. to correct for the difference in lateral and range magnification resulting from the Scheimpflug geometry) and also determines the centroid of the image 13', which, although represented as a line in FIG. 1, will in general have a finite width and will therefore give rise to output signals from horizontally adjacent elements of the photodetector.

Hence the scan data processor 25 receives signals representative of the true profile of the object 1 (as viewed at right angles to the plane of beam 3) as well as signals representative of the attitude and position of the photodetector 4 (which bears a fixed relationship to the position and attitude of the region of beam 3 which intersects the surface of the object 1), all in real time. In principle a description of the shape of the entire region of the object's surface swept by the beam 3 could be derived directly from the above data simply by applying the respective rotations and translations corresponding to each set of coordinate data sampled from photodetector 34.

However it is likely that accumulated position and attitude errors will build up during the scanning process and furthermore it is likely that, at least during some points in the scanning, the rotation and acceleration will be outside the dynamic ranges of the accelerometer and gyroscope. Accordingly, data is not acquired throughout the scanning period but only intermittently, either under the control of an operator-controlled switch T on the scanning device 10 or under the control of signals from the accelerometer and/or the gyroscope or for predetermined periods for example. Such signals can for example either be used to drive an indicator such as an LED to indicate to the operator that the acceleration and/or rate of rotation are within an acceptable range for data acquisition or can be used as gating signals to block the acquisition of data e.g. by disabling the clocking signals from circuitry 57 to sample and hold circuit 26.

Accordingly, in the presently preferred embodiment the processor 25 only applies the rotations and translations corresponding to a croup of successive profiles to generate a surface description of a small region of the scanned surface and stops generating this surface description (which will be a cloud of points in a common coordinate system) under the control of the operator and/or under the control of the above gating signals. A further surface description of another surface portion will then be generated in a similar manner e.g. in response to further operation of the switch or release of the gating signals. In this manner, successive scan files each comprising a cloud of points representative of a different but overlapping surface portion are generated. The position and attitude of the scanning device 10 is monitored throughout the scanning and accordingly the position and attitude of the photodetector 34 at the beginning of the generation of each scan file is known (albeit possibly with some accumulated errors) and is associated with the three-dimensional coordinate data of that scan file.

Thus each scan file consists of a three-dimensional cloud of points describing the surface coordinates of a region of the scanned surface, in association with data representative of the position and orientation of the photodetector 34 during the acquisition of each profile of that set. Successive scan files are output from processor 25 to a computer 47, which is provided with a display 131 and a keyboard 130.

Before describing the processing carried out in computer 47, a further optical arrangement will now be described with reference to FIG. 3, which shows a projector and detector which project a two-dimensional optical pattern onto the surface 35 of the object and detect an array of surface profiles of the object from this pattern. Accordingly this arrangement enables the acquisition of a set of three-dimensional coordinate data defining a surface portion of the scanned object without requiring any position or orientation signals, and can be substituted for the optical arrangement shown in FIG. 1.

Referring to FIG. 3, a semiconductor laser 29' transmits a laser beam to an optical arrangement 300 which may either include a cylindrical lens arranged to form a fan-shaped beam oriented perpendicular to the plane of the drawing or a scanner such as an oscillating mirror arrangement arranged to oscillate the beam perpendicular to the plane of the drawing to form a corresponding fan-shaped envelope. The resulting fan-shaped beam or envelope is then directed by a fixed mirror onto a 24 facet polygonal mirror 40 rotating at 20,000 r.p.m. which scans a beam or envelope 3' in the plane of the drawing as shown. The profile (represented so as an arrow a or b) defined by the intersection of this beam or envelope with the surface of the object is imaged by a lens 33 onto an inclined photodetector 34' and forms a corresponding image a' or b'. Preferably detector 34' satisfies the Scheimpflug condition in order to maximise the depth of field. Hence the profile a or b of the surface can be determined from the corresponding image a' or b'.

In order to relate each detected profile to a common coordinate system the instantaneous orientation of the beam or envelope 3' in the plane of the drawing must be known and accordingly the angular position of the polygonal mirror 40 is sensed by a sensor 41 which sends an angular position signal to a processor 42. Processor 42 samples the output of photodetector 34' in synchronism with the position signal from 41 and each resulting profile calculated by processor 42 is aligned relative to a common coordinate system according to the angular position signal. Hence the output of processor 41 is a cloud of points in a three-dimensional coordinate system which define the surface portion scanned by beam 3'. Preferably arrangement 300 includes a scanner which oscillates the laser beam rapidly perpendicular to the plane of the drawing (e.g. at 8 kHz), relative to the rate of oscillation of the resulting envelope 3' in the plane of the drawing and the photodetector 34' is a two-dimensional lateral effect photodiode. Such an arrangement has a very short response time and can generate an effectively instantaneous "snapshot" of the scanned portion of the surface before the scanning device has moved appreciably.

The advantage over the arrangement of FIG. 1 of this apparatus for scan file generation is twofold; firstly any errors in inertial navigation signals between stripes are eliminated, and secondly that data density of acquisitions within the scanned two dimensional area on the surface of the object will be much more linear, and totally independent of swiping speed.

The term 'effectively instantaneous' acquisition of data is used to describe an acquisition of many surface points in a two dimensional matrix or raster projected onto the surface of the object in a period which is so short that the maximum movement expected of the scanning device 10 in this time will be less than the required accuracy of the surface profile data.

For example, if the maximum sniping velocity expected is 250 mm/s and the required accuracy is 1 mm, then at the maximum velocity, it will take:

$$1/250 = 0.004 s.$$

Thus in 4 ms an entire two dimensional acquisition must be performed. Preferably, each acquisition will contain at least several hundred points. For example if each scan of polygonal mirror 40 results in the acquisition of an array of 32 by 32 points on the surface of the object, this will require 1,024/0.004=256,000 points to be acquired per second.

Besides the rotating polygon scanning arrangement described above, several possible scanning technologies are known which can currently meet this specification, including acousto-optic deflector and electro-optic deflector systems, which may optionally be combined with a resonant line scanner. All of these systems are capable of projecting a spot onto the surface at a variable angle to the scanning device in two dimensions, and can control the angle of projection at high speed.

In particular, acousto-optic deflectors can currently be obtained to alter the refractive index of a crystal to divert the beam in any one of up to 1000 linearly spaced unique angles. Certain acousto-optic devices may be coupled to provide XY random access deflection.

The rotating polygonal mirror system described above requires a medium-speed rotating polygonal mirror 40 to provide the line scan in each line of the raster, and a low-speed scanner such as a further rotating polygonal mirror in optical arrangement 300 to provide the vertical raster movement repositioning the start of each line. At a rotation speed of 20,000 r.p.m., polygonal mirror 40 provides a scan rate of 8,000 lines/sec if a 24 facet polygon is used (15 degree angle of scan), and scans 32 lines in 4 ms. The further rotating polygonal mirror of optical arrangement 300 may be a 24-facet polygon rotating at (1/0.004)/24×60= 625 RPM i.e. scanning once every 4 milliseconds.

As noted above, the preferred photodetector 34' is a lateral effect two dimensional linear silicon photodetector which generates an output indicating the offset of the centroid of the incident light relative to the centre of the photodetector in continuous analogue form. Such photodetectors are capable of resolving optical changes at several MHz.

The processor 42 in the embodiment of FIG. 3 preferably includes high speed flash analogue-to-digital converters which digitise the X and Y centroid signals from the photodetector which correspond to the surface profile at specific angle of projection of beam 3' at that point at the time of measurement. The digitised points are then converted to points in a three-dimensional coordinate system which is common to the entire scan performed by polygonal mirror 40 with the aid of signals from sensor 41, which may be a Hall effect sensor for example. These signals indicate the instantaneous orientation of beam 3'. If an acousto-optic device is used for scanning, the required information on the beam orientation can be derived from the drive signals to the device.

Much more data can be captured by using the arrangement of FIG. 3 than by using the arrangement of FIG. 1, and as the movement between scan files can be very small, each successive scan file can contain a very high proportion (e.g. 50% or more) of the data in the preceding scan, thus making overlapping almost complete. This enables the surface portions corresponding to successive scan files to be combined relatively easily to obtain a complete surface description of the object 1. In particular, although the arrangement of FIG. 3 is shown with an accelerometer 50 and a gyroscope 51 which are similar to the acclerometer and gyroscope of FIG. 1, it is not essential for the output of processor 42 to be combined with data derived from such an accelerometer and a gyroscope in order to give a succession of scan files including the required position and attitude data as generated by circuit 25 in FIG. 1. Instead the scanned surface portions can be combined by a computer without the assistance of such data, as will become apparent from the subsequent description. However the signals from the accelerometer and gyroscope can be used a) to derive the change in position and attitude of the scanning device between successive scan files so that successive pairs (or larger groups) of scan files can be combined to form composite scan files which require less processing to be fitted together to form the complete surface description and b) to provide position and attitude signals to the subsequent processing circuitry which indicate to that circuitry where regions of overlap between successive scan files may be found, thereby simplifying processing. The use of such signals will be described subsequently with reference to FIG. 5.

Figure 4:
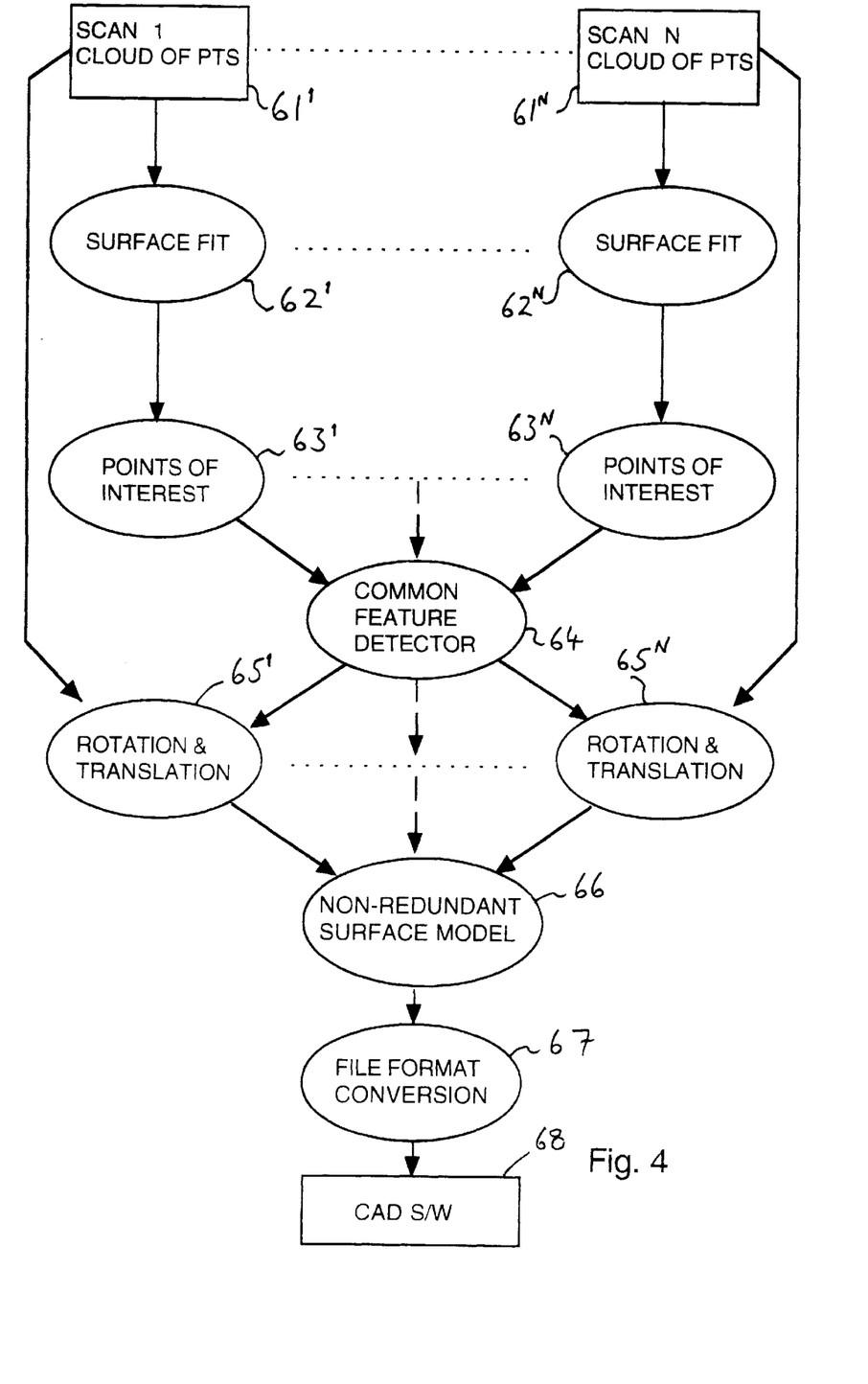
FIG. 4 is a flow diagram showing the image processing carried out by the arrangement of FIG. 2.

Turning now to FIG. 4, which illustrates the processes and dataflows carried out on the scan files by computer 47, the coordinate data of each scan file (numbered 1 to N) are represented as clouds of points $61^1$ to $61^N$.

The following sections detail the data and processes described in the diagram:

Data: scan file of raw 3D coordinate data

This is a file of data captured from a single scan of the scanning device 10 (represented as a CLOUD OF POINTS). It will contain a variable number of acquisitions of surface profile 3D coordinates. When the scanning device trigger switch T is pressed, and the speed in any direction exceeds a starting threshold, then a scan commences. When the trigger switch T is released, or the speed in any direction falls below a second (lower) threshold (for hysteresis), the scan is terminated. During this period, profile acquisitions are made at regular time intervals, and thus the number of profiles is directly proportional to the duration of the scan. Each profile acquisition will contain a number of distance samples along the length of the profile. In addition to the basic 3D coordinate data, a number of extra data items may be included in each scan file in order to assist various subsequent processes in performing error correction such as a scan file time stamp to indicate the time of the start of the scan, scanning device position and attitude, and surface colour in another embodiment.

Process 62: scan file surface fit

The scan file consists of essentially a set of randomly placed and unassociated points on which any further processing is extremely difficult as the points are unordered and in an unsuitable format for later post processing stages. This process fits a mathematical model to the surface described by the randomly ordered points in the scan file which is in a form suitable for later post processing operations. It should be noted that this mathematical model is not necessarily an expression for the surface in terms of x,y and z coordinates but is merely an ordered form of the raw data which enables features of interest such as discontinuities to be extracted in subsequent processes. This has two effects: ordering the data to a known format, and production of a complete surface model of the scanned area regardless of varying data density. It must be noted though, that some data is lost in this process, as the model of the surface does not retain the original raw coordinate data. There are various methods of producing a surface description of a set of unordered 3D coordinates, including i) k-d binary trees. ii) local neighbourhood region growth algorithms, and iii) Delaunay Triangulation of Voronoi diagrams.

i) The k-d Binary Tree

The k-d binary tree (Henderson 1983, Friedman et al 1977) positions the data on a binary tree in which each point on the tree is connected to its nearest neighbours. Thus subsequent surface feature detection is made possible by examination of each point in turn and its spatial relationship to its nearest neighbours.

ii) Local Neighbourhood Growth Algorithms

The local neighbourhood growth algorithms operate by selecting one or more seed points (usually at discontinuities) and growing the points into regions (influenced by the unstructured point data) until the regions meet and completely describe the set of unstructured points in a spatially coherent manner suitable for further processing. Growth of a region is prevented at a discontinuity (such as an edge for example) and hence this method has the advantage of automatically detecting discontinuities during the process, thus making the identification of points of interest in later processing much simpler. It has the disadvantage of requiring more processing than either of the other two methods described here.

iii) Delaunay Triangulation of Voronoi Diagram

In the Delaunay Triangulation of Voronoi diagram (Toussaint 1979), a Voronoi diagram is built up by defining a plane associated with each detected surface point such that each point within that plane is nearer to that detected surface point than to any of the other detected surface points. Thus a polyhedron is built up whosepolygonal faces are centred on respective detected surface points, the edges of the polygonal faces being midway between neighbouring detected surface points. The resulting partial polyhedron is then simplified by defining a triangular face between three detected surface points and measuring the perpendicular distance between it and the intermediate detected surface points lying above it. Depending on the magnitude of this distance, the triangle is either split into two triangles defined by these points as vertices or the points are eliminated The resulting description of the scanned object (a part of a polyhedron having triangular faces) is concise because extra triangles are only formed where the previous approximating surface was not satisfactory. Francis et al 1985 describe a similar method but for very large data sets.

The data resulting from process 62 will be a surface model in a form suitable for the extraction of points of interest. This surface model can be in the form of a set of splines, a binary tree, or a set of connected triangles or other polygons depending on the precise method used in process 62.

Process 63: detection of "points of interest"

These can be defined as points at which any derivative of the local surface (particularly the gradient i.e. the first derivative) passes through zero and include edges, corners, peaks, troughs and saddle regions. The methods for detecting these features include i) plane slicing and ii) surface curvature analysis. In some instances where surfaces are essentially featureless, small and easily removable markers of known shape and size may be placed on the object to be scanned in order to generate artificial "points of interest". These may be removed from the scan file at the end of the processing by a process of subtracting the appropriate 3-D model.

i) Plane Slicing

Conceptually, the process of plane slicing involves taking successive plane slices at regular intervals along an axis that traverses the approximate centre of the scan data. This will provide a set of contour maps, of the surface at successive depths into the range data. By interpreting the difference between the data in any given plane slice and its preceding and following planes features such as corners and edges may be detected. This process can be iterative, in that initially a coarse spacing between planes can be used, followed by successively finer spacing between planes until points of interest are identified.

ii) Surface Curvature Analysis

With spline or polygon descriptions of the surface form as the input data, surface curvature can be used to find discontinuities in a surface by detecting points with diverging splines. This method can also be used to detect surface features that will not be detected by other means, in that a smooth parabolic surface can be completely described mathematically, and used as a point of interest (its gradient passes through zero) for scan registration rather than surface point features as in the other methods.

For this reason, this method is important as a tool to a generic surface integration package, as it will allow the registration of scan files which contain few if any discontinuities. Besl et al IEEE Trans PAMI Vol 10 No 2 pp 167–192, March 1988 (incorporated herein by reference) describes a method of surface feature recognition using surface:two viewpoint invariant curvature metrics, namely Gaussian Curvature (K) and mean curvature (H). There are eight possible combinations of polarity of these parameters corresponding to eight possible surface types, namely peak, ridge, saddle ridge, flat, minimal surface, pit, valley, and saddle valley.

The data flow from process 63 comprises "points of interest" associated with each scan file and can be represented by a list (e.&. peak, saddle, saddle, trough) linked to a further list of spatial relationships between each of the points of interest. Each point of interest in the first list can be described by the following set of data or some subset:

Coordinates of the centre of the point of interest in the local co-ordinate reference frame for that scan.

Relative Acquisition angle of scanning device to point of interest in the local co-ordinate reference frame for the scan.

Type such as Peak, Trough, Pit, Saddle etc.

Magnitude of the discontinuity causing the point of interest.

Surface Characteristics e.g. colour, reflectivity (assuming that a photodetector responsive to such characteristics is used and that the relevant data is available).

Process 64: Common Feature Detector

By matching the set of points of interest and their spatial relationships in each scan file with the respective sets of points of interest of other scan files, surface features which are common to different scan files are identified. This technique is described in Soucy et al IEEE Trans. Pattern Analysis and Machine Intelligence 17 No. 4 April 1995 which is incorporated herein by reference.

In particular, for each pair of scan files, a search is performed for similar point of interest types, resulting in a list of common point of interest types between the pair of scan files. Subsequently, the relative spatial relationships between the common points of interest in the list for each scan can be compared by first matching distances between pairs of similar types to produce a subset of the original list where the spatial relationship between pairs of points of interests is matched. The relative spatial relationship of other neighbouring points of interest to the matching pair from each scan is then checked for a match containing three points of interest to produce a subset of the matching triplets of points of interest. This is the minimal requirement for determining that any set of features are common between scans. The process is continued until no further matches are found. The larger the number of matched points of interest, the greater the confidence in a correct matching between overlapping surface features between scans.

An example of such a process is as follows:

| Scan file 1 | Scan file 2 |
| --- | --- |
| peak | peak |
| peak | ridge |
| ridge | saddle |
| pit | minimal surface |
| pit | pit |

Firstly the features not common to scan files 1 and 2 (namely the saddle and minimal surface) are eliminated from the comparison.

Secondly the distances between each pair of features in scan file 1 are calculated and a corresponding calculation is made of the distances between each pair of features in scan file 2, resulting in the following lists:

| Scan file 1 | Scan file 2 |
| --- | --- |
| peak-peak distance | peak-ridge distance |
| peak-ridge distance a | peak-pit distance a |
| peak-ridge distance b | peak-pit distance b |
| peak-pit distance a | peak-pit distance c |
| peak-pit distance b | ridge-pit distance a |
| ridge-pit distance | ridge-pit distance b |
|  | ridge-pit distance c |

Each distance in scan file 1 is compared with corresponding distances (i.e. distances between corresponding groups of features, e.g. peak-ridge) in scan file 2. It may be found that peak-ridge distance a of scan file 1 matches the peak ridge distance of scan file 2, that the peak-pit distances a of the respective scan files match and that the ridge-pit distance of scan file 1 matches the ridge-pit distance a of scan file 2, for example. These matching distances are then processed to find the list of sets of three distances between the possible combinations of the three different features. The resulting lists in this case each comprise one set of distances between a peak, a ridge and a pit:

Scan file 1 peak-ridge distance, peak-pit distance, ridge-pit distance

Scan file 2 peak-ridge distance, peak-pit distance, ridge-pit distance

If these sets of distances match, then the peak, ridge and pit are assumed to be common to scan files 1 and 2.

For all scan files in which a minimum of three points of interest have been matched to another scan file in this manner, the three rotations (about the x, y and z axes of the coordinate system of one scan file) and the three translations (along those x, y, and z axes) required to superimpose the common points of interest of one scan file onto another are determined.

The above three rotations and translations are output from process 64 to process 65. In respect of each pair of scan files having common features (areas of overlap).

Process 65: scan file rotation & translation

The above rotations and translations are applied to the clouds of points of all the overlapping scan files, resulting in a single cloud of points defining the entire surface of the scanned object relative to an arbitrary coordinate system. Alternatively these rotations and translations may be applied to surface models generated in step 62.

The resulting data is of an identical type to the original scan file cloud of points or surface model, but translated to the common coordinate system.

Process 66: Non-Redundant Surface Model Generator

There are three basic methods of surface integration of a set of multiple ranged images into a single non-redundant file, any one of which can be selected for use in this process:

1.) Directly calculating surface models on sets of unorganised 3D points

These techniques have the advantage of being able to calculate a surface model with only point data. They make the assumption that:

a. the N nearest surface neighbours of point p can be estimated from its n nearest 3D neighbours, b. data density is relatively uniform over the surface of the object to be modelled, c. points are measured with the same accuracy Such techniques have problems at large surface discontinuities unless the sampling density is high, and when data is of differing accuracy ( e.g. when data is obtained from reflections at acute angles to the surface). An example of such a method is Hoppe's algorithm ( H. Hoppe et al, Proc. of SIG-GRAPH '92, pp 71–78, 1992 which is incorporated herein by reference).

2.) Producing a surface model assuming parametric surface descriptions for each of the scan files.

This method yields a more accurate surface model than 1.) when the registration error is small compared to the data acquisition error. For successful modelling using this technique, the object cannot have a hole, and the projection of the cylindrical or spherical grid on the surface of the object must be continuous.

3.) Estimating a surface model piecewise using Venn diagram of the set of scan files.

This method places no restrictions on the topology of the object to be modelled and is the single most useful method, although all three methods are available within process 66 and can be selected by the user by entering appropriate commands at the key-board 130 of the computer 47 (FIG. 2).

The method is described in section III (p 346 et seq) of Soucy et al IEEE Trans Pattern Analysis and Machine Intelligence (supra) and is summarised below.

Before combining the scan files, they are preprocessed in four steps.

a. Remove data below an accuracy threshold.

b. Remove data outside a depth window.

c. Detect range discontinuities by thresholding the 3D distance between horizontal and vertical neighbours in the raw scan files.

d. Project raw scan file onto a plane and parametrise using a square grid topology. In the resultant files of point coordinates (which are referred to below as range views), the parametric distances between two consecutive vertical points, and two consecutive horizontal points are equal.

The Venn diagram is obtained by calculating the common surface segments between all possible pairs of range views. Each area of overlap of surface features between two or more range views becomes a canonical subset of the Venn diagram. The procedure to obtain the Venn diagram from the set of range views consists of finding the intersections between all possible pairs of range views, and once computed, it is possible to determine for each point in each view which other views have sampled an element on the surface at that point. The contents of the canonical subsets of the Venn diagram are thus implicitly available.

Given that the point data will by noisy and have finite resolution, in order to determine whether a point in one range view matches a point in another view, two tests have to be performed, the Spatial Neighbourhood Test and the Surface Visibility Test. These tests must be performed on all surface points in both range views.

The Spatial Neighbourhood Test (SNT) is used to check whether the Euclidian distance between a point in one view, and a surface patch in another view is small enough in relation to the measurement error to determine that they belong to the same 3D neighbourhood. The definition of the surface patch is local and is defined as the plane formed by the three nearest neighbours of the point once transformed in the parametric grid of the other view.

The Surface Visibility Test (SVT) tests whether a patch in one view is visible to a patch in the other view by considering local surface orientation information. For example if two range views have respective sets of points with similar coordinates which therefore satisfy the Spatial Neighbourhood Test (SNT=TRUE), these sets of points might nevertheless belong to different surfaces, such as the inside and outside surface of a thin shell for example. The SVT criterion involves the determination of the angle between the normals to the surfaces corresponding to the sets of points; only if this angle is less than 90 degrees is the criterion satisfied (SVT=TRUE).

Points for which SNT=TRUE and SVT=TRUE are, to a first approximation, the points which are common to different range views. However the above estimates are not complete estimates of the canonical subsets (i.e. common points) because the above tests are unreliable near step discontinuities such as edges and corners for example.

Accordingly these initial estimates are used as seeds to an iterative region growing process that expands the seeds until they reach the boundaries marked by contours of steep discontinuity pixels. A consistency criterion must also be imposed to prevent an isolated point from growing freely. This criterion can be defined as at least fifty per cent of elements in an expanded region must be SNT and SVT TRUE The region growing algorithm relies on a modified 8-neighbour blob colouring algorithm. Instead of checking whether two 8-connected pixels in a given view share the same property or not, it checks to see if they are disconnected by a contour of step continuity pixels 4-connected to elements of a seed region in either of the views.

When extracting the non redundant model from the Venn diagram, first a set of triangulations modelling each canonical subset of the Venn diagram is calculated. These local triangulations are then combined to yield a complete integrated triangulation modelling the object.

The resulting model, in a custom format, is output from process 66 to process 67.

Process 67: file format conversion

The complete integrated triangulation model is used as the input data to a file format converter to produce a file describing the object in a standard file format suitable for display, manipulation and storage by a large number of 3D software packages including but not limited to CAD on a wide variety of platforms.

Data: Object Description in industry standard file format

Common 3D file formats which can be supported by the file format conversion utility include:

Bezier Curves, B-Spline Curves and Surfaces, B-Rep models, Constructive Solid Geometry (CSG) & CSG Tree, DXF geometry Exchange Format, Initial Graphics Exchange Standard (IGES) (and variants—VDA-IS/VDA-FS), Non Uniform Rational B-Splines (NURBS), Octree Model, and Step/Pdes.

This data is output to a CAD software package 68.

Some or all of the above processes may be displayed on the computer's display 131, particularly the rotations and translations needed to fit together the surface portions, which may be corrected or adjusted by the user. The computer 47 is suitably a graphics workstation or may be a high speed personal computer.

Figure 5:
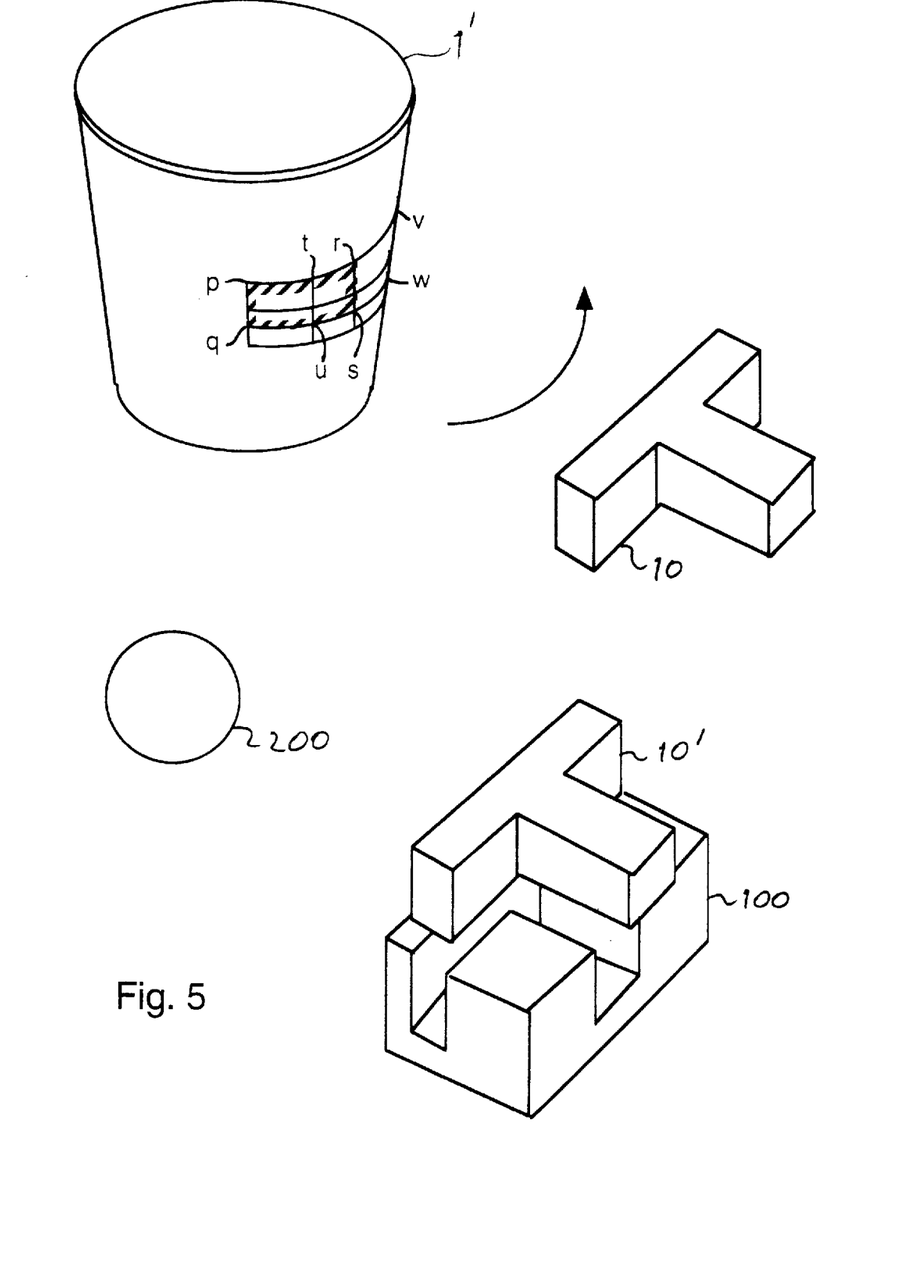
FIG. 5 is a sketch perspective view illustrating the projection of overlapping scanning patterns b the scanning device of FIG. 3.

Turning now to FIG. 5, an object 1' (a paper cup) is shown being scanned by a scanning device 10, which is assumed to incorporate the preferred optical arrangement and accelerometer and gyroscope of FIG. 3. The corners of the first scan (i.e. that area covered by one horizontal sweep of beam 3' due to the rotation of the polygonal mirror 40) over the surface of the object are indicated at p,q,r, and s and it will be noted that this overlaps substantially with the next scan t,u,v,w. Below these two scans, a second row of to further scans are shown on the surface of the cup and the operator holding the scanning device 10 ensures that the two rows overlap. As already noted in connection with the description of FIG. 3, the overlap between successive scans pqrs and tuvw is due to the rapid scanning rate of polygonal mirror 40 in relation to the rate at which the projected beam from the scanning device is swept across the surface of the scanned object 1'. Accordingly it is inevitable that the edge region of each scan (e.g. the region of scan pqrs shown hatched) will overlap the edge region of the next scan. For example, the edge region between corners r and of the first scan shown in FIG. 5 will overlap the edge region between corners t and u of the second scan.

Accordingly, COMMON FEATURE DETECTOR process 64 in FIG. 4 can be guided to look in the edge region of each scan file for overlap, preferable in real time as the scan files are generated by scanning device 10. In other words, instead of waiting until all of the scan files have been generated and then looking for overlap between every possible pair of scan files, the process 64 can look for overlap between regions (particularly edge regions) of successively generated scan files.

Furthermore it will be apparent that if inertial sensing means such as accelerometer 50 and gyroscope 51 are carried by scanning device 10, the outputs of such inertial sensing means can be processed to determine the velocity and direction of movement of the scans over the surface of the object 1' and hence to predict the precise regions of overlap of successive scan files. Even if the inertial sensing means is omitted, the velocity and/or direction of movement between the first two scans can be derived from the location of the common features in their scan files and can be used to predict, to a first approximation, the region in which the next two scans will overlap, so that COMMON FEATURE DETECTOR process 64 will look only in this region for common features. In these embodiments the processing needed to identify common points in successive scan files is much reduced and should be easily achievable in real time.

It may be desirable to re-set the accelerometer and gyroscope during the scanning and for this purpose a docking station 100 is provided, to which the scanning device may be returned periodically during scanning. If each sweep is begun by taking the scanning device from the docking station, the accumulated errors from the accelerometer and gyroscope can be reduced. Furthermore a reference object 200 of known size and shape may be scanned before the object 1' is scanned and used to calibrate the system.

In principle a file defining the entire surface of object 1' could be built up, provided that the object is kept in view by the photodetector 34' of the scanning device 10 throughout whilst sweeping the entire surface of the object with the projected pattern from the scanning device. However this may not always be practicable and in general it may be easier to combine successive scan files defining part of the surface of the object to form a composite scan file, to repeat this process to form further composite scan files, and then to combine the composite scan files at the end of the scanning process by means of processes 64 and 65 of FIG. 4 to form a complete surface description.

Furthermore the SURFACE FIT process 62 of FIG. 4 can be simplified if the coordinate data of all the points is read out from the processor 47 (FIG. 3) in serial fashion in a predetermined order (such as the order of acquisition for example) or in some other manner which preserves the information on their location within the scan. The nearest neighbours of each point can be identified from such information without requiring the calculation of the distances between all pairs of points, and hence a surface can be built up by joining each point to its nearest neighbours. Assuming that the angle of sweep of beam 3' in the scanning arrangement of FIG. 4 is relatively small, the resulting surface will approximate to a projection on a rectangular grid.

Accordingly it will be apparent that many of the the somewhat complex procedures for finding common features of scanned surface portions as described above with reference to FIG. 4 can be dispensed with if the preferred scanning arrangement of FIG. 3 is employed.

Furthermore performance advantages may be obtainable by using genetic algorithm techniques (as described in "Advances in Genetic Programming" by K. E. Kinnear and "Genetic Programming II: Automatic Discovery of Re-usable Programs" by John R. Koza, Department of Computer Science, Stanford University, Stanford, Calif. 94305, incorporated herein by reference) or the related technique of Boltzmann simulated annealing. In both cases, a random factor is introduced into the postprocessing algorithms with the results measured using fitness criteria such as, for example, closest approximation of points of interest (in large data sets) common to successive range data files, with subsequent selection of those progeny algorithms producing the best fit, over multiple iterations. A similar method for reorientation and registration of data files in 6 dimensional space mast be derived easily from the techniques described in Report No. STAN-CS-TR-95- 1535 Thesis: Random Networks in Configuration Space for Fast Path Planning, December 1994 by Lydia E. Kavraki, Department of Computer Science, Stanford University, Stanford, Calif. 94305, which is also incorporated herein by reference.

Figure 6:
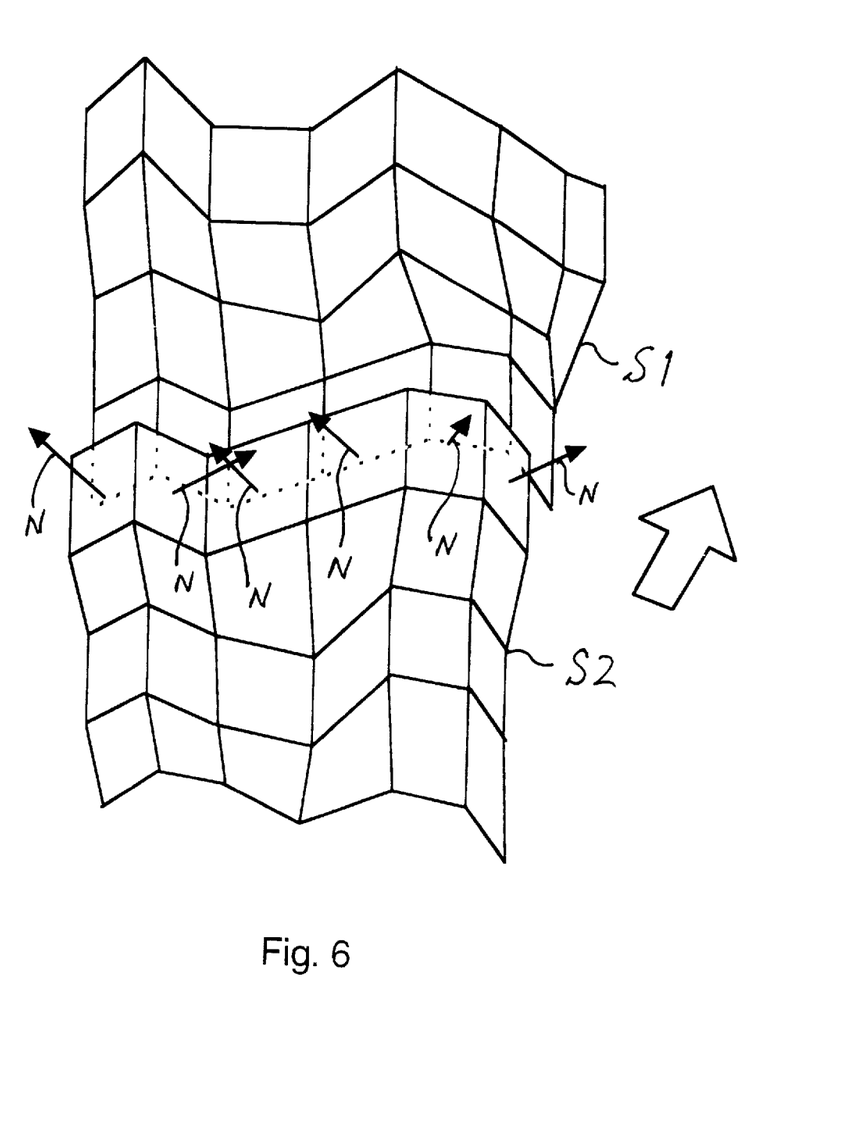
FIG. 6 is a sketch perspective views illustrating a method of registering overlapping scanned surface portions.

In this connection, reference is made to FIG. 6 which shows two surfaces S1 and S2 in the form of projections on a rectangular grid which have been derived from successive scan files output from the scanning arrangement of FIG. 4. The normals N defined by (say) the four adjacent points of one surface S2 are calculated at least for the overlapping edge portions of the surface and then a) the distance alone each normal at which it cuts surface S2 is calculated and b) the three rotations and translations needed to minimise the sum of these distances of intersection (corresponding to the best overlap) is determined by the genetic or other iterative algorithm. Such a technique does not require the detection of discontinuities or other "points of interest".

A further embodiment of the present invention could provide simultaneous capture of a colour and texture overlay with surface position data, by the use of a colour CCD or similar two dimensional colour photodetector device instead of, or in addition to, the present photodetector, while strobing the laser or using a broadband light source.

A still further embodiment of the present invention may retain the inertial position and attitude measurement system as described in connection with FIGS. 1 and 2 but may use any other means for determining the surface coordinates relative to the scanning device.

In a still further embodiment of the present invention the position and attitude measurement system may be mounted on the object to be measured and the object can be moved around the fixed scanning device, or a further position and attitude measurement system may be provided on the object being scanned in addition to that on the scanning device, enabling both the scanned object and the scanning device to be moved freely.

Furthermore it is not essential to process the scan files to compare overlapping surface in order to register the detected surface portions of the scanned object. Instead, the required rotations and translations could be derived entirely from the outputs of the inertial sensing means if the inertial sensing means is sufficiently accurate.

The laser 29 used as the light source may be replaced by a light-emitting diode and other wavelengths besides optical wavelengths can be used, particularly I.R. wavelengths. Accordingly the term "optical" is to be construed broadly to include any radiation or arrangement which obeys the laws of optics.

A still further embodiment of the present invention could utilise a controllable lens system with variable magnification in order to provide increased dynamic range of depth measurement.

A still further embodiment of the present invention could include a density, mass and volume calculator in the computer (47).

If the surface of the scanned object is highly reflective or highly transparent, the application of inert fine powder, for example fingerprinting dust, may be helpful.

We claim:

1. A scanning arrangement for determining three-dimensional surface characteristics of an object, the arrangement comprising a scanning device which is freely movable relative to said object, the device comprising:

a) an optical projector for projecting a predetermined pattern onto a region of the surface of the object, and b) an optical detector for detecting the surface characteristics of said region and for generating output signals representative of such surface characteristics, the arrangement further including:

c) processing means coupled to said detector for generating a set of output data representing said surface characteristics of a scanned portion of the surface of said object, d) combining means coupled to said processing means for combining sets of such output data derived from overlapping scans of said surface into a common set of output data by appropriate rotations and translations, said combining means including further processing means for calculating said rotations and translations from subsets of respective sets of such output data which relate to a common area of said surface, and
   e) correcting means responsive to output data from said further processing means for correcting for movement of said scanning device relative to said object between successive scans.

2. A scanning arrangement according to claim 1 wherein said combining means comprises:
   a) means for recognizing features of said object common to overlapping scans, and
   b) means for translating said sets of output data to a common coordinate system in which a feature as detected in one scan is superimposed on that feature as detected in an overlapping scan.

3. A scanning arrangement according to claim 1 wherein said optical detector comprises:
   a) a detector sensitive to the two-dimensional position of said pattern, and
   b) imaging means for forming on said detector an image of the intersection of said pattern with said region.

4. A scanning arrangement according to claim 3 wherein said optical projector includes means for projecting a line of optical radiation onto said region and is spaced apart from said detector along a first axis, said line of optical radiation being substantially perpendicular to said first axis.

5. A scanning arrangement according to claim 3 wherein said optical projector includes means for projecting a two-dimensional pattern of optical radiation onto said region.

6. A scanning arrangement according to claim 3 wherein said optical detector comprises scanning means for scanning said optical pattern relative to said scanning device.

7. A scanning arrangement according to claim 3 wherein said detector is inclined with respect to the optic axis of said imaging means.

8. A scanning arrangement according to claim 1 wherein said optical detector is sensitive to the color of the surface of said object and said output data includes data representative of said color.

9. A scanning arrangement for determining three-dimensional surface characteristics of an object, the arrangement comprising a scanning device which is freely movable relative to said object, the device comprising:
   a) an optical projector for projecting a predetermined pattern onto a region of the surface of the object, and
   b) an optical detector for detecting the surface characteristics of said region and for generating output signals representative of such surface characteristics,
the arrangement further including:
   c) processing means coupled to said detector for generating a set of output data representing said surface characteristics of a scanned portion of the surface of said object,
   d) combining means coupled to said processing means for combining sets of such output data derived from overlapping scans of said surface into a common set of output data by appropriate rotations and translations,
   e) inertial sensing means for detecting movement of said scanning device relative to said object and generating motion output signals representative of such movement, and
   f) correcting means responsive to said motion output signals from said inertial sensing means for correcting for movement of said scanning device relative to said object between successive scans.

10. A scanning arrangement according to claim 9 wherein said inertial sensing means comprises means for generating acceleration data indicative of the linear acceleration of said scanning device, said scanning arrangement further comprising:
   g) integrating means responsive to said acceleration data for determining changes in linear position of said scanning device between successive scans.

11. A scanning arrangement according to claim 10 wherein said inertial sensing means is coupled to means for inhibiting the acquisition of said output data when the detected acceleration is outside a predetermined range.

12. A scanning arrangement according to claim 10 wherein said inertial sensing means is coupled to means for inhibiting the processing of said output data when the detected acceleration is outside a predetermined range.

13. A scanning arrangement according to claim 9 wherein said inertial sensing means comprises means for determining the rotation of said scanning device between successive scans.

14. A scanning arrangement according to claim 13 wherein said inertial sensing means is coupled to means for inhibiting the acquisition of said output data when the detected rate of rotation is outside a predetermined range.

15. A scanning arrangement according to claim 13 wherein said inertial sensing means is coupled to means for inhibiting the processing of said output data when the detected rate of rotation is outside a predetermined range.

16. A scanning arrangement according to claim 9 wherein said inertial sensing means is responsive to changes in position of said scanning device during each scan and is arranged to correct each set of output data for such changes in position during each scan.

17. A scanning arrangement according to claim 9 wherein said inertial sensing means is responsive to changes in attitude of said scanning device during each scan and is arranged to correct each set of output data for such changes in attitude during each scan.

18. A scanning arrangement according to claim 9 wherein said scanning device carries multiple inertial sensing means for determining changes in position of said scanning device along three mutually perpendicular axes and changes in orientation of said scanning device about three mutually perpendicular axes.

19. A scanning arrangement for determining the shape of an object, the arrangement comprising a scanning device, said scanning device comprising:
   a) an optical projector for projecting a predetermined pattern onto a region of the surface of the object, and
   b) an optical detector for detecting the coordinates of said region and for generating output signals representative of such coordinates,
the arrangement further including:
   c) processing means coupled to said detector for generating a set of output data representing said surface characteristics of a scanned portion of the surface of said object,
   d) combining means coupled to said processing means for combining sets of such output data derived from overlapping scans of said surface into a common set of output data by appropriate rotations and translations,
   e) inertial sensing means for detecting movement of said scanning device relative to said object and generating motion output signals representative of such movement, and f) correcting means responsive to said motion output signals from said inertial sensing means for correcting for movement of said scanning device relative to said object between successive scans.

20. A scanning arrangement for determining the shape of an object, the arrangement comprising a scanning device, said scanning device comprising:

a) an optical projector for projecting a predetermined pattern onto a region of the surface of the object, and b) an optical detector for detecting the coordinates of said region and for generating output signals representative of such coordinates, said scanning device being freely movable relative to the object, the arrangement further including:

c) processing means coupled to said detector for generating a set of output data representing said surface characteristics of a scanned portion of the surface of said object, and d) combining means coupled to said processing means for combining sets of such output data derived from overlapping scans of said surface into a common set of output data by appropriate rotations and translations, said combining means including further processing means for calculating said rotations and translations from subsets of respective sets of such output data which relate to a common area of said surface, e) inertial sensing means for detecting movement of said scanning device relative to said object, and f) correcting means responsive to output data from said further processing means and said inertial sensing means for correcting for movement of said scanning device relative to said object between successive scans.

21. A method of determining three-dimensional surface characteristics of an object by means of a scanning device, the method comprising:

a) projecting from the scanning device a predetermined optical pattern onto a region of the surface of the object, b) optically detecting the surface characteristics of said region with an optical detector mounted on said scanning device, c) deriving a set of output data representing said surface characteristics of said region, d) repeatedly scanning said optical pattern over said object in overlapping fashion and deriving further sets of output data from overlapping scans, and e) correcting said sets of output data for movement of said scanning device relative to said object between successive scans by determining the movements needed to superimpose subsets of respective sets of said output data which relate to an area of said surface which is common to said sets, said scanning device being freely movable with respect to the object.

22. A method according to claim 21 wherein said scanning device is hand-held.

23. A method according to claim 21 wherein said movements are determined between successively acquired sets of output data.

24. A method according to claim 21 wherein predetermined regions of said overlapping scans are processed to determine regions of overlap.

25. A method according to claim 21 wherein said predetermined regions are determined from data indicative of the movement of said optical pattern over the surface of said object.

26. A method according to claim 21 wherein an iterative algorithm is used to determined said movements.

27. A method according to claim 21 wherein normals to scanned surface regions are generated and the distances along these normals at which they intersect other surface regions are determined under different rotations and translations.

28. A method according to claim 21 wherein groups of surface features of respective scans are identified and compared in order to determine said movements.

29. A method according to claim 21 wherein said surface characteristics include the surface coordinates of the object surface.

30. A method of determining three-dimensional surface characteristics of an object by means of a scanning device, the method comprising:

a) projecting from the scanning device a predetermined optical pattern onto a region of the surface of the object, b) optically detecting the surface characteristics of said region with an optical detector mounted on said scanning device, c) deriving a set of output data representing said surface characteristics of said region, d) repeatedly scanning said optical pattern over said object in overlapping fashion and deriving further sets of output data from overlapping scans, and e) correcting said sets of output data for movement of said scanning device relative to said object between successive scans by sensing movement of said image acquisition device relative to said object with an inertial sensing means, said scanning device being freely movable with respect to the object.

31. A method according to claim 30 wherein said scanning device is hand-held.

32. A method according to claim 30 wherein said movements are determined between successively acquired sets of output data.

33. A method according to claim 30 wherein said surface characteristics include the surface coordinates of the object surface.

* * * * *

UNITED STATES PATENT AND TRADEMARK OFFICE
CERTIFICATE OF CORRECTION

Page 1 of 2

PATENT NO. : 5,850,289
DATED : December 15, 1998
INVENTOR(S) : Guy Richard John FOWLER et al.

It is certified that error appears in the above-identified patent and that said Letters Patent is hereby corrected as shown below:

Column 3, line 60, change "vibrators" to --vibratory--.

Column 4, line 17, change "scope" to --gyroscope--.

Figure 2, insert reference numerals --51a--, --51b-- and --51c-- as follows:

Signed and Sealed this

Eighth Day of June, 1999

*Attest:*

*Attesting Officer*

Q. TODD DICKINSON

Acting Commissioner of Patents and Trademarks

UNITED STATES PATENT AND TRADEMARK OFFICE
CERTIFICATE OF CORRECTION

Page 2 of 2

PATENT NO. : 5,850,289

DATED : December 15, 1998

INVENTOR(S) : Guy Richard John Fowler et al.

It is certified that error appears in the above-identified patent and that said Letters Patent is hereby corrected as shown below:

Fig. 2